3,488,733
Patented Jan. 6, 1970

3,488,733
HYDROXYLATED STEROIDS
Patrick A. Diassi, Westfield, and Pacifico A. Principe, South River, N.J., assignors to E. R. Squibb & Sons, Inc., New York, N.Y., a corporation of Delaware
No Drawing. Filed Mar. 20, 1968, Ser. No. 714,423
Int. Cl. C07c *169/32, 167/00*; A61k *17/00*
U.S. Cl. 260—397.45              6 Claims

ABSTRACT OF THE DISCLOSURE

This invention relates to the production of new 14α- and 15β-oxygenated-16-dehydro steroids of the pregnane series. These products are prepared microbiologically by subjecting 21-acetoxypregna-4,16-diene-3,20-dione to the action of enzymes of microorganisms selected from the group consisting of *Thamnidium elegans*, *Syncephalastrum racemosum*, and *Absidia coerulea*. The 14- and 15-oxygenated compounds of this invention are physiologically active steroids which possess progestional and mineralocorticoid activity.

---

This invention relates to and has as its objective the provision of new physiologically active steroids and new intermediates useful in the preparation thereof. The final products of this invention may be represented by the general formulae

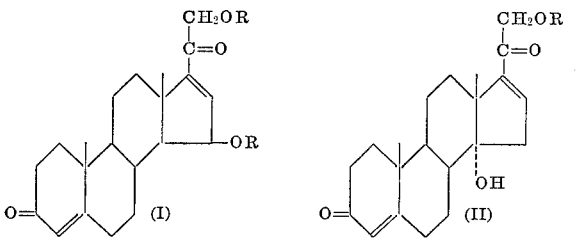

wherein R represents hydrogen or acyl.

The above compounds may be prepared by subjecting 21-acetoxypregna-4-16-diene-3,20-dione to the action of enzymes of a member selected from the group consisting of *Thamnidium elegans*, *Syncephalastrum racemosum*, and *Absidia coerulea*. The use of *Syncephalastrum racemosum* results in the production of 15β,21-dihydroxypregna-4,16-diene-3,20-dione. The use of *Thamnidium elegans* results in the production of 14α,21-dihydroxypregna-4,16-diene-3,20-dione. Enzymes of *Absidia coerulea* result in the production of a mixture of these two materials.

The hydroxy derivatives thus produced may then be converted to the corresponding acyloxy derivatives by conventional acylation methods well known in the art, such as, treatment with an appropriate acid or acid anhydride, for instance, acetic anhydride.

The preferred acyl radicals employed are those of hydrocarbon carboxylic acids of less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic arylcarboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cyloalkenyl-lower alkanoic acids [e.g., cyclohexaneacetic, α-cyclopentanebutyric, 2 cyclopenteneacetic and 3-(3-cyclohexene) pentenoic acid], and the like.

The enzymatic hydroxylation can best be effected either b including the steroid substrate in an aerobic culture of the microorganism, or by bringing together, in an aqueous medium, the steroid, air and the microorganism. In general, the conditions for culturing the microorganisms for the purposes of this invention are (except for the inclusion of the steroid to be converted) the same as those for culturing various other molds for the production of antibiotics and/or riboflavin.

The microorganism is aerobically grown in contact with (in or on) a suitable fermentation medium. A suitable medium essentially comprises a nitrogenous substances and a source of carbon and energy. The latter may be a carbohydrate (such as sucrose, molasses, glucose, maltose, starch or dextrin) a fatty acid, a fat and/or the steroid itself. Preferably, however, the medium includes an assimilable source of carbon and energy in addition to the steroid. The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea). An adequate sterile air supply should be maintained during fermentation, for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10% by weight. The culture period may vary considerably, e.g., within the range of about 6 to 96 hours. The steroid is then recovered from the fermentation medium in the usual manner, as more fully detailed in the examples following.

The hydroxyl groups may then be acylated in the usual manner, as by treating the steroid with an acid anhydride or acyl chloride of one of the hydrocarbon carboxylic acids of less than twelve carbon atoms mentioned hereinbefore. The reaction is preferably carried out in the presence of an organic base, such as pyridine.

The final products of this invention are physiologically active substances which possess progestational activity both orally and parenterally. As such they may be employed in the veterinary field for treating conditions in both large and small animals (e.g., dogs, cats, sheep, cows, horses, and the like) which require a progestational agent. For instance, in animal breeding, the compounds of this invention are useful in preventing threatened abortion and may be administered for this purpose in dosages of about 2 to about 100 mg./kg. of body weight daily. In addition, control of milk and egg production may be achieved by regulation of the cycles of cows and chickens through the administration of the compounds of this invention in daily dosages, also of about 2 to about 100 mg./kg. of body weight.

The products of this invention also possess mineralocortical activity, and may accordingly be employed in lieu of desoxycortocosterone for treating conditions in various mammalian species (e.g., dogs, cats, cattle, horses, and the like) resulting from adrenal insufficiency such as uremia and metabolic disorders with derangement of electrolyte balance. Dosages for such purpose may range from about 2.5 to 5.0 mg. per day in dogs, to about 20.0 to 25.0 mg. per day in cattle, for instance.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also, one-piece gelatin capsules containing the same amount of medicament may be prepared using sufficient corn oil or other suitable vegetable oil, to render the compound capsulatable. Tablets may be prepared by using starch, lactose or other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base.

The active substances may also be made up in a form suitable for parenteral administration, i.e., as a suspension in sterile water or an organic liquid usually employed for injectable preparations, for example, a vegetable oil such as olive oil, or a sterile solution in an organic solvent.

The final products of this invention may be formulated into a preparation suitable for topical administration in conventional manner with the aid of one or more carriers or excipients. Examples of types of topical formulation include ointments, creams, sprays, aerosols, and the like. Ointments and creams may, for example, be formulated with an aqueous or oily base with the addition of suitable thickening and/or gelling agents. Such bases may, for example, include water and/or an oil such as liquid paraffin or a vegetable oil such as castor oil, arachis oil, or the like. Various thickening agents may be employed in accordance with the nature of the base, for example, soft paraffin aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediates and final products) are surface active agents which may therefore be employed in a variety of applications requiring such an agent. For example, the compounds of this invention may be employed as emulsifying agents in the preparation of lubricants, adhesives, polishes, wax compositions, and the like. Further, these compounds are ultraviolet-absorbing materials and may be employed as sun-screening agents. They may also be employed as anti-oxidants and corrosion inhibitors for various hydrocarbons and mixtures thereof. As an example of materials to which the compounds of this invention may be added for this purpose, may be mentioned gasoline, hydrocarbon lubrication oils and greases, hydrocarbon solvents (e.g., toluene, kerosene), and the like.

The following examples illustrate the invention, all temperatures being in degrees centigrade:

EXAMPLE 1

14α,21-dihydroxypregna-4,16-diene-3,20-dione

Surface growth from each of two, two-week-old agar slants of *Thamnidium elegans* (ATCC–18,191), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to one liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |
| Distilled water to one liter. | |

After 24 hours incubation at 25° C. with continuous rotary agitation (280 cycles/minute; two-inch stroke), 10% (vol./vol.) transfers are made to forty 250 ml. Erlenmeyer flasks each containing 50 ml. of freshly sterilized medium (B). Steroid (200 micrograms/ml.) is then added by supplementing each flask with 0.25 ml. of a sterile solution (40 mg./ml.) of 21-acetoxypregna-4,16-diene-3,20-dione in N,N-dimethylformamide. A total of 400 mg. is fermented.

After approximately 28 hours of further incubation, using identical conditions as described above, the contents of the flasks are pooled and the broth is then filtered through a Seitz clarifying pad. The fasks, mycelium and pad are washed with successive 100 ml. portions of warm water. The combined filtrate and washings have a volume of 2000 ml. They are extracted three times with 400 ml. portions of chloroform which are combined, washed well with water and evaporated under reduced pressure. The residue (267 mg.) is purified by thin layer chromatography using silica gel $HF_{254}$ as adsorbent and ethyl acetate-chloroform (1:1, v.:v.) as the developing solvent. Detection of the band at $R_f \approx 0.4$ followed by elution with 20% methanol in ethyl acetate and evaporation gives a residue which on crystallization from acetone-hexane gives 134 mg. of 14α,21-dihydroxypregna-4,16-diene-3,20-dione having a melting point about 184–185° C., $[\alpha]_D^{25} +112°$ (chloroform), $\lambda_{max}^{alc.}$ 240 m$\mu$ ($\epsilon$, 24,000), $\lambda_{max}^{Nujol}$ 2.88, 2.90, 6.00, 6.06, 6.20, 6.31$\mu$, $\tau_{CDCl_3}^{SiMe_4}$ 8.86 (s., 18-$CH_3$), 8.76 (s., 19-$CH_3$), 5.48 (m., 21-$CH_2$), 4.25 (s., 4-H), 3.25 (t., 16-H).

*Analysis.*—Calcd. for $C_{21}H_{28}O_4$ (344.44): C, 73.22; H, 8.19. Found: C, 73.15; H, 8.18.

EXAMPLE 2

14α,21-dihydroxypregna-4,16-diene-3,20-dione 21-acetate

A solution of 31 mg. of 14α,21-dihydroxypregna-4,16-diene-3,20-dione in 0.5 ml. of dry pyridine and 0.25 ml. of acetic anhydride is left at room temperature for 16 hours. It is then evaporated under reduced pressure and the residue dissolved in chloroform and washed with water and the residue crystallized from acetone-hexane to give 17.1 mg. of 14α,21 - dihydroxypregna - 4,16 - diene - 3,20-dione-21-acetate having a melting point about 215–17° C., $[\alpha]_D^{25} +102°$ (chloroform), $\lambda_{max}^{alc.}$ 240 m$\mu$ ($\epsilon$, 24,600); $\lambda_{max}^{Nujol}$ 2.98, 5.72, 5.97, 6.08, 6.20, 6.30$\mu$; $\tau_{CDCl_3}^{SiMe_4}$ 8.89 (s., 18-$CH_3$), 8.78 (s., 19-$CH_3$), 7.83 (s., 21-OAc), 5.04 (s., 21-$CH_2$), 4.30 (s., 4-H), 3.27 (t., 16-H).

*Analysis.*—Calcd. for $C_{23}H_{30}O_5$ (386.47): C, 71.48; H, 7.82. Found: C, 70.51; H. 7.66.

EXAMPLE 3

15β,21-dihydroxypregna-4,16-diene-3,20-dione

Surface growth from each of two, two-week-old agar slants of *Syncephalastrum racemosum* (ATCC–18,192), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to one liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

|   | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |
| Distilled water to one liter. | |

After 24 hours incubation at 25° C. with continuous rotary agitation (280 cycles/minute; two-inch stroke), 10% (vol./vol.) transfers are made to forty 250 ml. Erlenmeyer flasks each containing 50 ml. of freshly sterilized medium (B). Steroid (200 micrograms/ml.) is then added by supplementing each flask with 0.25 ml. of a sterile solution (40 mg./ml.) of 21-acetoxypregna-4,16-diene-3,20-dione in N,N-dimethylformamide. A total of 400 mg. is fermented.

After approximately 44 hours of further incubation, using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 2000 ml. It is extracted three times with 600 ml. portions of chloroform which are combined, washed twice with 900 ml. portions of water and evaporated under reduced pressure. Crystallization of the residue (196 mg.) from acetone-hexane gives 51 mg. of 15β,21-dihydroxypregna-4,16-diene-3,20-dione having a melting point about 219–221°, $[\alpha]_D^{25}+48.6°$ (chloroform), $\lambda_{max.}^{alc.}$ 238 m$\mu$ ($\epsilon$, 23,150), $\lambda_{max.}^{Nujol}$ 2.90, 5.99–6.02$\mu$, 6.20, 6.30$\mu$, $\tau_{CDCl_3}^{SiMe_4}$ 8.68 (s., 18-$CH_3$), 8.72 (s., 19-$CH_3$), 5.48 (m., 21-$CH_2$—), 5.28 (m., $W_H$=12 cps., 15$\alpha$-H), 4.25 (s., 4-H), 3.27 (d, J=3, 16-H)

Analysis.—Calcd. for $C_{21}H_{28}O_4$ (344.44): C, 73.22; H, 8.19. Found: C, 72.59; H, 8.15.

EXAMPLE 4

15β,21-dihydroxypregna-4,16-diene-3,20-dione 15,21-diacetate

A solution of 25 mg. 15β,21-dihydroxypregna-4,16-diene-3,20-dione in 3 ml. of dry pyridine and 1 ml. of acetic anhydride is left at room temperature for 16 hours then diluted with ice-water and extracted with chloroform. The chloroform is washed successively with 2 N hydrochloric acid, 5% sodium bicarbonate and water and evaporated under reduced pressure. The residue is plate chromatographed on silica gel $HF_{254}$ using ethyl acetate-chloroform (1:1, v.:v.) as the developing solvent. The band at $R_f \approx 0.6$ detectable by U.V. is separated and eluted with 20% methanol-ethyl acetate. Evaporation of the solvent gives non-crystalline 15β,21-dihydroxypregna-4,16-diene-3,20-dione 15,21-diacetate having $\tau_{CDCl_3}^{SiMe_4}$ 8.74 (s., 18-$CH_3$), 8.74 (s., 19-$CH_3$), 7.92 (s., 15-OAc), 7.83 (s., 21-OAc), 4.56 (m., $W_H \approx 9$ cps., 15$\alpha$-H), 4.27 (s., 4-H), 3.28 (d, J=2.5, 16-H).

EXAMPLE 5

15β,21-dihydroxypregna-4,16-diene-3,20-dione and 14α,21-dihydroxypregna-4,16-diene-3,20-dione 21-acetate Surface growth from each of two, two-week-old agar slants of Absidia coerulea (CBS) (Centraalbureau voor Schimmel Culture, Baarn, Netherlands), the slants containing as a nutrient medium (A):

|   | Grams |
|---|---|
| Glucose | 10 |
| Yeast extract | 2.5 |
| $K_2HPO_4$ | 1 |
| Agar | 20 |
| Distilled water to one liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

|   | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |
| Distilled water to one liter. | |

After 24 hours incubation at 25° C. with continuous rotary agitation (280 cycles/minutes; two-inch stroke) 10% (vol./vol.), transfers are made to thirty-four 250 ml. Erlenmeyer flasks each containing 50 ml. of freshly sterilized medium (B). Steroid (300 micrograms/ml.) is then added by supplementing each flask with 0.25 ml. of a sterile solution (60 mg./ml.) of 21-acetoxypregna-4,16-diene-3,20-dione in N,N-dimethylformamide. A total of 510 mg. is fermented.

After approximately 30 hours of further incubation using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 1700 ml. The filtrate is extracted with three 500 ml. portions of chloroform which are combined, washed with two 700 ml. portions of water and evaporated under reduced pressure. Crystallization of the residue (260 mg.) gives 97 mg. of 15β,21-dihydroxypregna-4,16-diene-3,20-dione.

The mother liquor residue is acetylated at room temperature for 16 hours as described in Example 4. Thin layer chromatography of the product on silica gel $HF_{254}$ gives two bands detectable by U.V. The less polar band gives 15β,21-dihydroxypregna-4,16-diene-3,20-dione 15,21-diacetate and the more polar band on isolation gives 14α,21-dihydroxypregna-4,16-diene-3,20-dione 21-acetate.

The invention may be variously otherwise embodied within the scope of the appended claims.

What is claimed is:

1. A compound having the formula

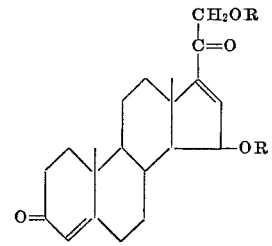

wherein R is selected from the group consisting of hydrogen and acyl radicals of hydrocarbon carboxylic acids of less than 12 carbon atoms.

2. A compound in accordance with claim 1 having the name 15β,21-dihydroxypregna-4,16-diene-3,20-dione.

3. A compound in accordance with claim 1 having the name 15β,21-dihydroxypregna-4,16-diene-3,20-dione 15,21-diacetate.

4. A compound having the formula

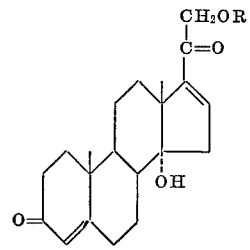

wherein R is as set forth in claim 1.

5. A compound in accordance with claim 4 having the name 14α,21-dihydroxypregna-4,16-diene-3,20-dione.

6. A compound in accordance with claim 4 having the name 14α,21-dihydroxypregna-4,16-diene-3,20-dione 21-acetate.

References Cited

UNITED STATES PATENTS

| | | | |
|---|---|---|---|
| 2,673,866 | 3/1954 | Murray et al. | 260—397.45 |
| 2,889,346 | 6/1959 | Ringold et al. | 260—397.47 |
| 2,964,544 | 12/1960 | Ringold et al. | 260—397.47 |

LEWIS GOTTS, Primary Examiner

ETHEL G. LOVE, Assistant Examiner

U.S. Cl. X.R.

44—78; 106—3, 14, 270; 195—51; 250—83; 252—52, 56, 89, 170, 356, 396, 407, 522; 260—397.47; 424—243

PO-1050
(5/69)

UNITED STATES PATENT OFFICE
CERTIFICATE OF CORRECTION

Patent No. 3,488,733      Dated January 6, 1970

Inventor(s) Patrick A. Diassi and Pacifico A. Principe

It is certified that error appears in the above-identified patent and that said Letters Patent are hereby corrected as shown below:

Column 2, line 5, "b" should read - - by - -; and on line 15, "substances" should read - - substance - -. Column 3, line 17, "substances" should read - - substance - -. Column 4, between lines 52 and 53 insert - - shed with water. The chloroform is evaporated under reduced pressure - -.

SIGNED AND
SEALED
JUL 7 1970

(SEAL)
Attest:

Edward M. Fletcher, Jr.
Attesting Officer

WILLIAM E. SCHUYLER, JR.
Commissioner of Patents